United States Patent Office 2,905,686
Patented Sept. 22, 1959

2,905,686

NEW DYESTUFFS OF THE PERYLENE TETRA-CARBOXYLIC ACID SERIES

Wilhelm Eckert, Frankfurt am Main, and Hermann Remy, Bad Soden (Taunus), Germany, assignors to Farbwerke Hoechst Aktiengesellschaft vormals Meister Lucius & Brüning, Frankfurt am Main, Germany, a corporation of Germany No Drawing. Application April 29, 1957
Serial No. 655,538

Claims priority, application Germany May 4, 1956

3 Claims. (Cl. 260—281)

The present invention relates to new valuable dyestuffs of the perylene tetracarboxylic acid series, more particularly it relates to dyestuffs corresponding to the following formula:

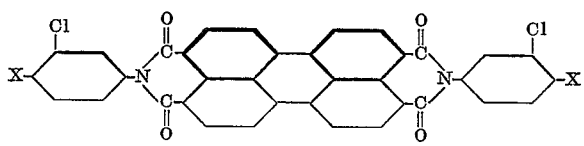

wherein X represents a hydrogen or chlorine atom.

In our U.S. patent application Serial No. 661,261, filed May 23, 1957, now abandoned, for "New Dyestuff of the Perylene Tetracarboxylic Acid Series," is described a process for the manufacture of a dyestuff which can be used with special advantage for coloring plastics, such as polyvinyl chloride containing a plasticizer or polyethylene, lacquers and printing inks, which comprises condensing perylene-3,4,9,10-tetracarboxylic acid or its anhydride with paracyclohexyl-aniline. The colored products are distinguished by very good properties of fastness.

Now we have found that dyestuffs of similar excellent properties are obtained by reacting perylene-3,4,9,10-tetracarboxylic acid or its anhydride with 3-chloroaniline or 3,4-dichloroaniline.

The new dyestuffs are very suitable as pigments in the printing ink and lacquer industries, for fast coloring plastics, such as polyvinyl chloride containing a plasticizer or polyethylene, furthermore for coloring so-called bakable lacquers or for dyeing the spinning solution.

The following examples serve to illustrate the invention, but they are not intended to limit it thereto, the parts being by weight unless otherwise stated, and the relationship of parts by weight to parts by volume being the same as that of the kilogram to the liter:

Example 1

20 parts of perylene-3,4,9,10-tetracarboxylic acid dianhydride, 40 parts of 3-chloroaniline and 10 parts by volume of concentrated hydrochloric acid are introduced successively into 400 parts by volume of quinoline, while stirring. The mixture is heated for 15 hours at 200° C., while continuously distilling off the water. The product is suction filtered in the cold, washed several times with methanol, boiled with dilute sodium hydroxide solution, washed with hot water until neutral, and dried.

The red dyestuff which crystallizes from quinoline in short prisms does not melt at a temperature up to 300° C., is difficultly soluble in the customary organic solvents and dissolves in concentrated sulfuric acid to a violet solution without fluorescence. It is distinguished by an extraordinary brightness and excellent fastness properties, both in lacquers and in polyvinyl chloride mixtures, and possesses a very good fastness to oil, to over-spraying, to solvents, to bleeding and to light.

Example 2

20 parts of perylene-3,4,9,10-tetracarboxylic acid dianhydride and 10 parts by volume of concentrated hydrochloric acid are introduced successively into 200 parts of 3-chloroaniline, while stirring. The mixture is heated for 12 hours at 200–220° C. while continuously distilling off the water. The product is then suction-filtered in the cold and worked up as described in Example 1. The dyestuff so obtained is identical with the product described in Example 1.

Example 3

20 parts of perylene-3,4,9,10-tetracarboxylic acid dianhydride, 48 parts of 3,4-dichloroaniline and 10 parts by volume of concentrated hydrochloric acid are introduced successively into 400 parts by volume of quinoline, while stirring. The mixture is heated for 15 hours at 200° C., while continuously distilling off the water. The product is suction-filtered in the cold, washed several times with methanol, boiled with dilute sodium hydroxide solution, washed with hot water until neutral, and dried.

The red dyestuff which is difficultly soluble in the customary organic solvents does not melt at a temperature up to 300° C. and dissolves in concentrated sulfuric acid to a violet solution without fluorescence. It is distinguished by an extraordinary brightness and excellent fastness properties, both in lacquers and in polyvinyl chloride mixtures, and possesses a very good fastness to oil, to over-spraying, to solvents, to bleeding and to light.

Example 4

In an autoclave provided with a stirrer, 20 parts of perylene-3,4,9,10-tetracarboxylic acid dianhydride, 50 parts of 3,4-dichloroaniline and 10 parts by volume of concentrated hydrochloric acid are introduced successively into 320 parts of water. The mixture is stirred for 12 hours at 210–220° C. under a pressure of 40 atmospheres (gauge). The product is then suction-filtered in the cold and worked up as described in Example 3. The dyestuff so obtained is identical with the product described in Example 3.

We claim:

1. The dyestuffs corresponding to the following general formula

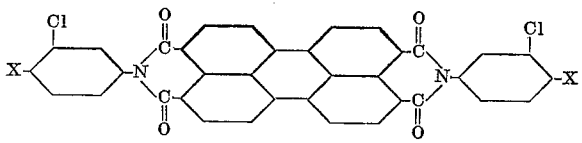

wherein X represents a member selected from the group consisting of hydrogen and chlorine.

2. The dyestuff corresponding to the following formula

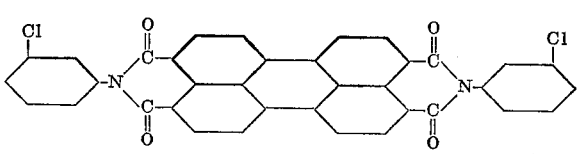

3. The dyestuff corresponding to the following formula

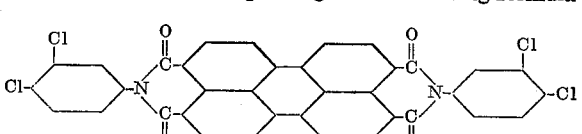

References Cited in the file of this patent

FOREIGN PATENTS 505,332    Canada _____ Aug. 24, 1954